(12) United States Patent
Sperling

(10) Patent No.: US 12,742,728 B2
(45) Date of Patent: Sep. 22, 2026

(54) APPARATUS AND METHOD FOR INSPECTING SURFACES WITH WAVELENGTH ANALYSIS

(71) Applicant: BYK-Gardner GmbH, Geretsried (DE)

(72) Inventor: Uwe Sperling, Geretsried (DE)

(73) Assignee: BYK-GARDNER GMBH, Geretsried (DE)

( * ) Notice: Subject to any disclaimer, the term of this patent is extended or adjusted under 35 U.S.C. 154(b) by 174 days.

(21) Appl. No.: 18/688,143

(22) PCT Filed: Aug. 11, 2022

(86) PCT No.: PCT/EP2022/072620

§ 371 (c)(1),
(2) Date: Feb. 29, 2024

(87) PCT Pub. No.: WO2023/030861

PCT Pub. Date: Mar. 9, 2023

(65) Prior Publication Data

US 2024/0377314 A1 Nov. 14, 2024

(30) Foreign Application Priority Data

Sep. 2, 2021 (DE) ......................... 102021122713.5

(51) Int. Cl.
*G01N 21/31* (2006.01)

(52) U.S. Cl.
CPC ....... *G01N 21/31* (2013.01); *G01N 2201/062* (2013.01)

(58) Field of Classification Search
CPC ............. G01N 21/31; G01N 2201/062; G01N 21/4738; G01N 21/8422;
(Continued)

(56) References Cited

U.S. PATENT DOCUMENTS 4,886,355 A 12/1989 Keane
2011/0109910 A1 5/2011 Georgakoudi et al.
(Continued)

FOREIGN PATENT DOCUMENTS

EP 3078950 A1 10/2016
JP 2003-075257 A 3/2003
(Continued)

OTHER PUBLICATIONS

International Search Report and Written Opinion received in Application No. PCT/EP2022/072620 dated Oct. 25, 2022.
(Continued)

*Primary Examiner* — Md M Rahman
(74) *Attorney, Agent, or Firm* — Knobbe, Martens, Olson & Bear, LLP

(57) ABSTRACT

An apparatus for examining surface properties of lacquered surfaces, in particular of motor vehicles, having a first illumination device which illuminates a surface to be examined at a first illumination angle, having a second illumination device which illuminates the surface at a second illumination angle, having a first sensor device which records radiation reflected and/or scattered by the surface illuminated by the second illumination device at a first recording angle and outputs at least one value which is characteristic of the radiation reaching the sensor device from the surface, wherein the apparatus has a radiation analysis device which analyses radiation scattered and/or reflected by the surface with regard to its wavelength.

20 Claims, 3 Drawing Sheets

(58) Field of Classification Search
CPC ... G01N 2021/4711; G01N 2021/4735; G01N 2021/4771; G01N 2021/555; G01N 2021/8427; G01N 21/57
USPC ........................................................ 356/326
See application file for complete search history.

(56) References Cited

U.S. PATENT DOCUMENTS

| | | | | |
|---|---|---|---|---|
| 2014/0152990 | A1 | 6/2014 | Ehbets et al. | |
| 2015/0247811 | A1 * | 9/2015 | Yun | G01N 23/2076 378/45 |
| 2015/0338209 | A1 * | 11/2015 | Knüttel | G01B 9/02027 356/51 |
| 2016/0258865 | A1 | 9/2016 | Kawano et al. | |
| 2019/0049304 | A1 | 2/2019 | Ehbets et al. | |

FOREIGN PATENT DOCUMENTS

| | | | |
|---|---|---|---|
| JP | 2008-164628 | A | 7/2008 |
| JP | 2021-047200 | A | 3/2021 |
| WO | WO 2015/072223 | A1 | 5/2015 |

OTHER PUBLICATIONS

Search Report received in German Application No. 102021122713.5 dated Apr. 19, 2022.

Office Action dated Mar. 25, 2026 in Japanese Application No. 2024-513968, in 10 pages.

Office Action dated Mar. 3, 2026 in European Application No. 22765464.7, in 5 pages.

* cited by examiner

APPARATUS AND METHOD FOR INSPECTING SURFACES WITH WAVELENGTH ANALYSIS

BACKGROUND

Field

The present invention relates to an apparatus and a method for examining surface properties and, in particular, optical surface properties.

Description of the Related Art

Such apparatuses are known from the state of the art, which inspect surfaces, for example the surfaces of motor vehicles. Surfaces of motor vehicles are sometimes very complicated coatings which, in addition to a base coat, also have other lacquer layers and, in particular, lacquer layers which in turn have effect pigments. Such effect pigments create different optical impressions, which also depend on the direction of observation and/or the type of incident light, for example diffuse lighting or directional lighting.

SUMMARY

The present invention is based on the object of enabling such surfaces to be assessed as comprehensively and accurately as possible. According to the invention, this is achieved by the subjects of the independent patent claims. Advantageous embodiments and further developments are the subject of the subclaims.

An apparatus according to the invention for examining and in particular for inspecting surface properties of lacquered surfaces, in particular of motor vehicles, has a first illumination and/or radiation device which illuminates a surface to be examined at a first illumination angle (and/or radiates radiation onto this surface).

Furthermore, the apparatus has a second illumination device which illuminates the surface at a second illumination angle. Preferably, the first illumination angle and the second illumination angle differ from each other.

Furthermore, the apparatus has a first sensor device which records reflected and/or scattered radiation from the surface illuminated by the second illumination device at a first recording angle and outputs at least one value which is characteristic of the radiation reaching the sensor device from the surface According to the invention, the apparatus has a radiation analysis device which analyzes radiation scattered and/or reflected by the surface with regard to its wavelength.

Preferably, the radiation analysis device records radiation that has been irradiated onto the surface by the first illumination device and scattered and/or reflected by the surface and, in particular, scattered.

The applicant has determined that with multi-angle color measurement, the main focus of obtaining information about the surfaces, namely the color measurement at different angles, can be supplemented by measuring the gloss behavior. In the case of an automotive lacquer with a basecoat and a clearcoat finish, the spectrally resolved gloss measurement using a radiation analysis device allows the influence of the color of the basecoat on the measurement of the gloss level of the clearcoat to be taken into account.

This allows more extensive evaluation options than in classic, non-spectrally resolved gloss measurement, where illumination is performed with a specified standard light and detected using v-lambda filtering (corresponding to the sensitivity of the human eye).

The value that is characteristic of the radiation reaching the sensor device from the surface is preferably an intensity of this radiation.

Preferably, the sensor device detects an integral value that is characteristic of the recorded radiation, in particular a value integrated over a plurality of wavelengths.

As explained in more detail below, the radiation analysis (by performing an integration) preferably also serves as the first sensor device.

Preferably, the radiation analysis device thus performs a spectral analysis of the radiation impinging on it, in particular of the radiation originating from the first illumination device. On the other hand, it also integrates these spectral components in order to obtain an intensity integrated over the wavelengths (in particular of the radiation originating from the second illumination device).

Advantageously, the apparatus has a housing within which the first sensor device, the radiation analysis device and/or the illumination devices are arranged.

In a further advantageous embodiment, the apparatus has a control device for controlling the illumination devices. This control device can be designed in such a way that it controls the illumination of the surface with the illumination devices alternately and/or with a time offset. In this way, it is possible for the surface to be illuminated from different directions and the scattered radiation to be analyzed by the radiation analysis device and, on the other hand, for the surface to be illuminated and the radiation reflected from the surface to be detected by the sensor device.

In a further preferred embodiment, the directions of incidence or illumination of all incoming and outgoing radiation lie in one plane. This means that the illuminations and the observations of the surface take place in one plane. This plane is preferably perpendicular to the surface to be examined.

In a further advantageous embodiment, at least one illumination device has a light-emitting diode (LED). In particular, at least one illumination device has a white light LED. Preferably, at least one illumination device emits standard light and in particular D65 standard light. Standard light refers to the standardized spectral radiation distribution curves of characteristic emitters. The D65 standard light type is a radiation distribution with a color temperature of 6504 Kelvin (which corresponds approximately to a gray overcast sky).

In a further preferred embodiment, the apparatus has at least one and preferably at least two lens devices and, in particular, achromatic lens devices. In a further advantageous embodiment, the apparatus has at least one segmented lens device. In this way, installation space can be saved. These lens device(s) are preferably arranged in the beam path between an illumination device and the surface to be examined.

In a further preferred embodiment, the lens device or devices is or are arranged in a beam path between the surface and the sensor device and/or radiation device. In a further advantageous embodiment, the lens device or devices is or are arranged between the illumination device or devices and the surface (to be inspected).

Preferably, at least one illumination device emits diffuse light onto the surface to be inspected. Preferably, at least one illumination device emits directed radiation onto the surface to be inspected. Particularly preferably, the illumination device whose illumination is recorded by the radiation analysis device emits directional radiation onto the surface.

In a further preferred embodiment, the radiation analysis device and the first sensor device record the radiation scattered and/or reflected by the surface at the same recording angle or detection angle.

In a further preferred embodiment, the radiation analysis device and the first sensor device are arranged at the same location and/or at the same (angular) position.

In a further advantageous embodiment, the radiation analysis device is also a component of the sensor device and/or the radiation analysis device also serves as the first sensor device. The sensor device and radiation analysis device are preferably identical, one and the same component, namely preferably a spectrometer. This embodiment is particularly cost-effective. However, it would also be conceivable to design the sensor device and the radiation analysis device as separate components and/or separately In a further advantageous embodiment, the radiation analysis device has a spectrometer and/or a monochromator. Preferably, this spectrometer can in particular analyze wavelengths in the visible wavelength range, i.e. in particular wavelengths in the range between 400 nm and 700 nm.

In a further advantageous embodiment, the radiation analysis device is arranged in such a way that it records radiation irradiated onto the surface by at least one of the illumination devices and radiation scattered by the surface. In addition, the radiation analysis device is also arranged in such a way that it records radiation irradiated onto the surface by at least one of the illumination devices and radiation reflected from the surface.

In a further preferred embodiment, the apparatus has a third illumination device and/or radiation device which is arranged with respect to the surface at a third illumination angle and/or which irradiates radiation with respect to the surface at a third illumination or irradiation angle.

Preferably, the radiation analysis device also records radiation that has been irradiated onto the surface by the third illumination device and scattered by it (also in the direction of the radiation analysis device). Preferably, the radiation analysis device outputs a spectrally resolved signal with regard to this radiation.

In a further preferred embodiment, at least one illumination angle is between 30° and 60°, preferably between 35° and 55°, preferably between 40° and 50° and particularly preferably at 45°. An angle of 0° is understood to be an angle at which one direction is perpendicular to the surface to be examined or inspected.

In a further preferred embodiment, at least one illumination angle is between 5° and 40°, preferably between 5° and 30°, preferably between 10° and 20° and particularly preferably at approx. 15°. An angle of 0° is understood to be an angle at which one direction is perpendicular to the surface to be examined or inspected.

In a further advantageous embodiment, at least one illumination angle is greater than 60°, preferably greater than 65°, preferably greater than 70°, preferably greater than 75° and particularly preferably greater than 80° (relative to the vertical direction). This means that the radiation is emitted onto the surface to be inspected at a very flat angle. At such angles, the above-mentioned effect pigments preferably have a relatively small influence on the illumination of the observation.

Preferably, the radiation is observed or analyzed by means of the radiation analysis device at an angle of (+ or −) 45°. Accordingly, irradiation preferably takes place at an angle of − or + 45°. This means that the radiation analysis device preferably also records reflected radiation.

In a further advantageous embodiment, the apparatus has a fourth illumination device, which is arranged at a fourth illumination angle relative to the surface. In this embodiment, the apparatus therefore preferably has a total of four illumination devices, which particularly preferably illuminate and/or irradiate the surface at four different angles. Preferably, all of these illumination devices are arranged in such a way that all of the radiation incident on the surface lies in one plane.

Preferably, the radiation analysis device also records radiation that has been irradiated onto the surface by the fourth illumination device and scattered by it (also in the direction of the radiation analysis device). Preferably, the radiation analysis device outputs a spectrally resolved signal with regard to this radiation.

In a further preferred embodiment, at least one illumination device is suitable and intended to irradiate radiation of different wavelengths onto the surface. This can be done, for example, by means of different color filter elements, which are arranged between the illumination device and the surface. For example, different color filters can be arranged on a filter wheel. A filter device of this type is particularly preferably between the illumination device and the surface to be inspected.

It would also be possible for filter elements to be arranged between the illuminated surface or the surface to be inspected and the image capture device.

In a preferred embodiment, the apparatus can be moved relative to the surface to be examined. For example, the apparatus can be a portable device or it can be arranged on a robot device.

In a preferred embodiment, a (particularly relative) position of the apparatus in relation to the surface to be examined can be recorded. For example, several measured values can be recorded at different positions on the surface and these can be compared with each other. In particular, a relative position of a first measurement position in relation to a second measurement position can also be recorded.

In a further advantageous embodiment, the apparatus has a memory device which is suitable and intended for at least temporarily storing the recorded measurement results (in particular both values recorded by the sensor device and values recorded by the radiation analysis device). Preferably, these values can be stored in particular with an assignment to the area or location of the recording.

The present invention is further directed to a method for examining surface properties of lacquered surfaces, in particular of motor vehicles (and in particular the exterior surfaces of motor vehicles), wherein a first illumination device illuminates a surface to be examined under a first illumination angle.

Furthermore, a second illumination device illuminates the surface at a second illumination angle and a first sensor device records reflected and/or scattered radiation from the surface illuminated by the second illumination device at a first recording angle and outputs at least one value which is characteristic of the radiation reaching the sensor device from the surface.

According to the invention, a radiation analysis device analyzes radiation scattered and/or reflected by the surface, in particular with regard to its wavelength. In particular, this is radiation that has been scattered and/or reflected from the surface as a result of illumination by at least one illumination device.

Particularly preferably, the radiation analysis device outputs at least one value and preferably a plurality of values which are characteristic of spectral properties of the radiation impinging on the radiation analysis device.

It is therefore also proposed on the method side that a wavelength-dependent analysis of the radiation falling on the radiation analysis device is carried out.

In a preferred method, the aforementioned radiation and/or illumination devices are activated with a time delay.

In a further preferred method, both the measured values output by the image recording device (which are characteristic in particular for an intensity of the incident radiation) and the data recorded by the radiation analysis device are taken into account for an evaluation of the surface properties.

In a further preferred method, an illumination device irradiates radiation onto the surface and the radiation analysis device records the radiation irradiated by the illumination device and reflected by the surface.

In a further preferred method, the radiation analysis device analyzes the radiation or light using a spectrometer.

Preferably, the radiation analysis device outputs a signal that is characteristic of a wavelength or a wavelength distribution of the radiation irradiated onto the surface and/or emitted by the surface. In particular, this makes it possible to assess the frequency spectrum in which the surface reflects radiation, which is in particular important for the evaluation of lacquering with effect pigments.

Preferably, the wavelength-dependent distribution detected by the radiation analysis device is also integrated over the wavelength range and an integral intensity of the incident radiation is also determined in this way. This is carried out in particular for the radiation that was irradiated at the angle of reflection, i.e. in particular for the radiation that was irradiated by the second illumination device.

In a further preferred method, a third illumination device illuminates the surface at a third angle. Preferably, this third angle differs from the aforementioned first and second angles. Preferably, the radiation originating from the third illumination device and scattered by the surface is also recorded (at least in part) by the radiation analysis device and analyzed with regard to its wavelength (i.e. in particular spectrally).

In a further preferred method, the color of at least one illumination or irradiated radiation is changed at least temporarily.

In a further preferred method, the radiation detection device records and analyzes the radiation radiated onto and reflected from the surface at several locations on the surface to be examined. In this way, measurement data can be recorded from several areas of the surface.

Preferably, data and/or values recorded at several points on the surface are compared with each other. In this way, the gloss behavior of the surface to be examined (i.e. the behavior that can be determined by the radiation analysis device) can preferably be determined and evaluated over a larger area of the surface.

Preferably, recorded data is assigned to a location on the surface where the respective measurement was taken.

BRIEF DESCRIPTION OF THE DRAWINGS

Further advantages and embodiments are shown in the attached drawings.

In the drawings.

DETAILED DESCRIPTION

Figure 1:
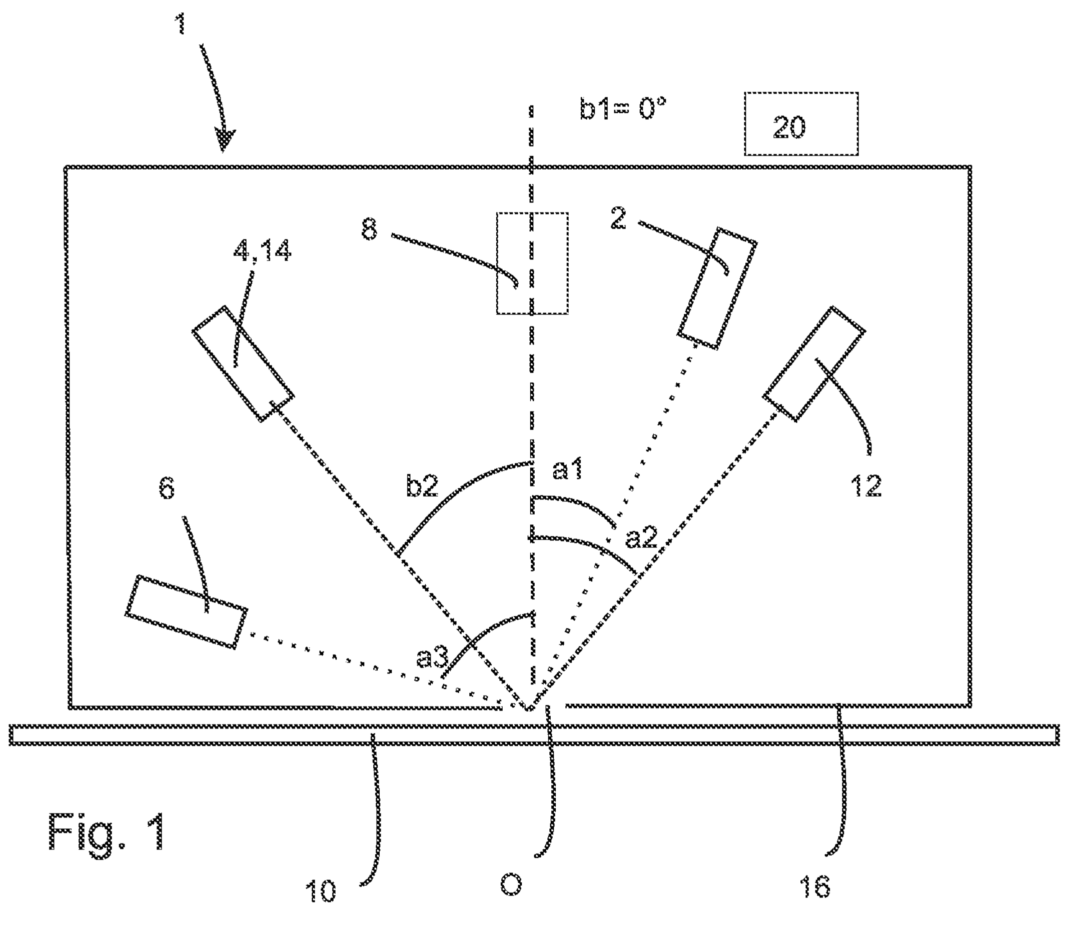
FIG. 1 shows a schematic representation of the apparatus according to the invention.

FIG. 1 shows a schematic representation of an apparatus 1 according to the invention, which has a first illumination device 2 that illuminates a surface 10 to be inspected at a first illumination angle a1 or irradiates light at this angle. A sensor device 4 records the radiation scattered or reflected by the illuminated surface and, in particular, the scattered radiation.

The reference sign 16 indicates a housing within which the described components are arranged. Preferably, an inner wall of this housing is designed to absorb radiation. The reference sign O indicates an opening through which the surface 10 can be illuminated and/or through which the surface can be observed.

The reference sign 12 identifies a second illumination device, which also irradiates radiation onto the surface at a predetermined angle a2. This predetermined angle is 45° here. The reference sign 14 identifies a radiation analysis device which records the radiation irradiated onto the surface by the illumination device 12 and reflected by the surface and analyzes it with regard to its wavelength. The radiation analysis device also functions as the sensor device 4.

The reference sign 6 indicates a further illumination device which illuminates the surface at a very flat angle. The radiation analysis device 14 preferably records radiation from the surface illuminated by the illumination device 6 (or records radiation which has been irradiated onto the surface by the illumination device 6 and has been reflected and/or scattered by the surface and in particular scattered). It is thus proposed that the surface 10 is illuminated at different angles and that the radiation reflected and/or scattered by the surface is recorded by the radiation analysis device in each case.

The reference sign 8 indicates a further illumination device, which here also illuminates the surface 10. The radiation analysis device 14 also records the radiation irradiated by the further illumination device and reflected and/or scattered by the surface.

In the embodiment shown here, the surface is therefore illuminated from three different angles and the radiation analysis device records the radiation scattered by the surface in each case and carries out a spectral analysis of this radiation.

The reference sign a1 indicates the first incidence or illumination angle (relative to the vertical direction) at which the first illumination device 2 illuminates the surface 10. This angle is 30° in this case. The reference sign b1 indicates the fourth incidence angle at which the illumination device 8 illuminates the surface 10. This is 0° here, so the illumination is perpendicular to the surface 10. However, it is also possible that this illumination is not at 0° but at a predetermined angle, which is preferably less than 20°, preferably less than 10° (relative to the perpendicular direction).

The reference sign a2 identifies the second incidence and/or illumination angle at which the second radiation device 12 emits radiation onto the surface 10. This second incidence and/or illumination angle is 45° here. The reference sign b2 indicates the second recording angle at which the radiation analysis device 14 and the sensor device are arranged relative to the surface 10 or at which the reflected radiation is recorded. In this case, this angle is −45° relative to the surface 10.

The reference sign a3 indicates a third incidence and/or illumination angle at which the third radiation device 6 illuminates the surface 10. In this case, this is approximately −70°. Optionally, a fourth radiation device can also be provided, which illuminates the surface at a further incidence and/or illumination angle.

The reference sign 20 schematically identifies a control device which causes the illumination of the surface from the different angles to take place with a time delay. In addition, the apparatus preferably has a storage device (not shown) in which data recorded by the radiation analysis device are stored.

The sensor device 4, which is used to detect the radiation reflected from the surface 10, also uses the radiation analysis device, but an integrator device (not shown) again integrates the recorded spectrum over the wavelengths and thus outputs an integrated value for the intensity.

Figure 2:
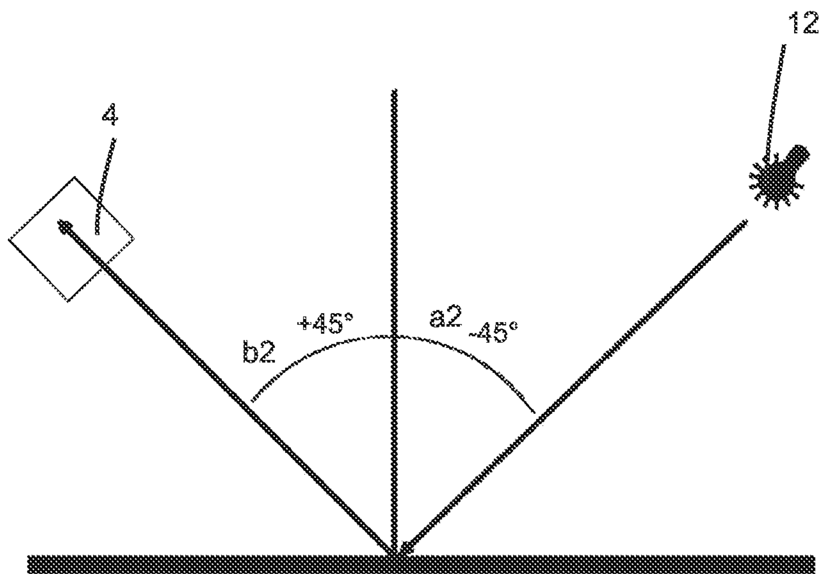
FIG. 2 shows a diagram illustrating the beam analysis.

FIG. 2 illustrates the gloss measurement process in more detail. Preferably, the second illumination device 12 irradiates radiation onto the surface 10 at an angle of 45° (relative to the vertical direction) and the radiation analysis device records the radiation reflected from the surface at the reflection angle (here)−45°. Preferably, the illumination device emits standard light, in particular D65 standard light. Furthermore, the illumination device preferably emits directed radiation onto the surface.

The sensor device 4 records the reflected radiation. The radiation analysis device 14 can analyze the radiation impinging on it more precisely, preferably with regard to its wavelength, and can preferably output an intensity distribution in a wavelength range of between 300 nm and 900 nm, preferably between 350 nm and 800 nm and particularly preferably between 400 nm and 700 nm. However, an integrated value of the intensity over the wavelengths is output as the measured value for this measurement. Due to this integration, the radiation analysis device is also referred to here as the sensor device 4.

Figure 3:
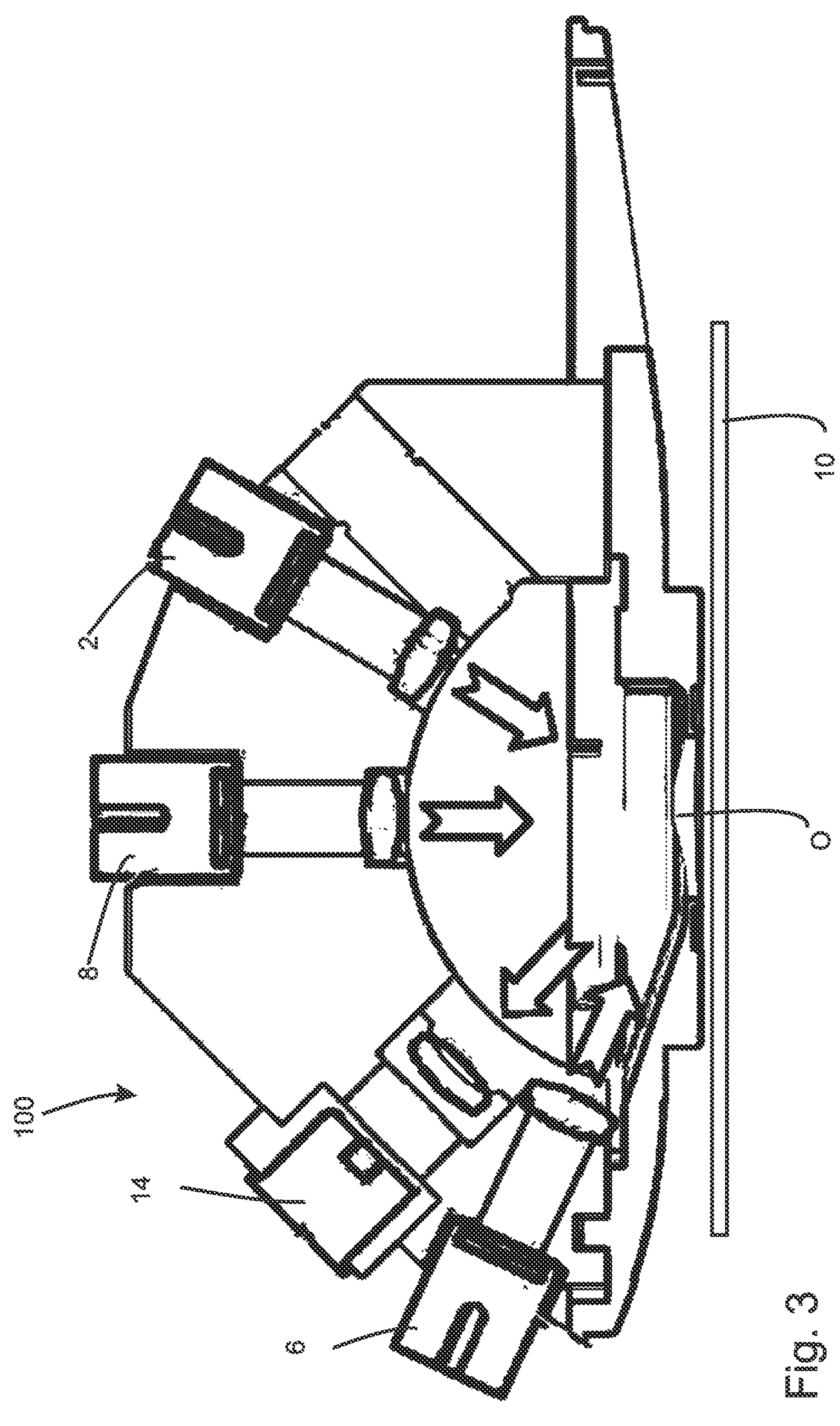
FIG. 3 shows a further illustration of an apparatus according to the state of the art.

FIG. 3 shows an apparatus according to the internal prior art of the applicant. Here again, the illumination devices 2, 6 and 8 can be seen, each of which emits radiation onto the surface, and the sensor device 4, which records the radiation reflected and/or scattered by the surface.

Figure 4:
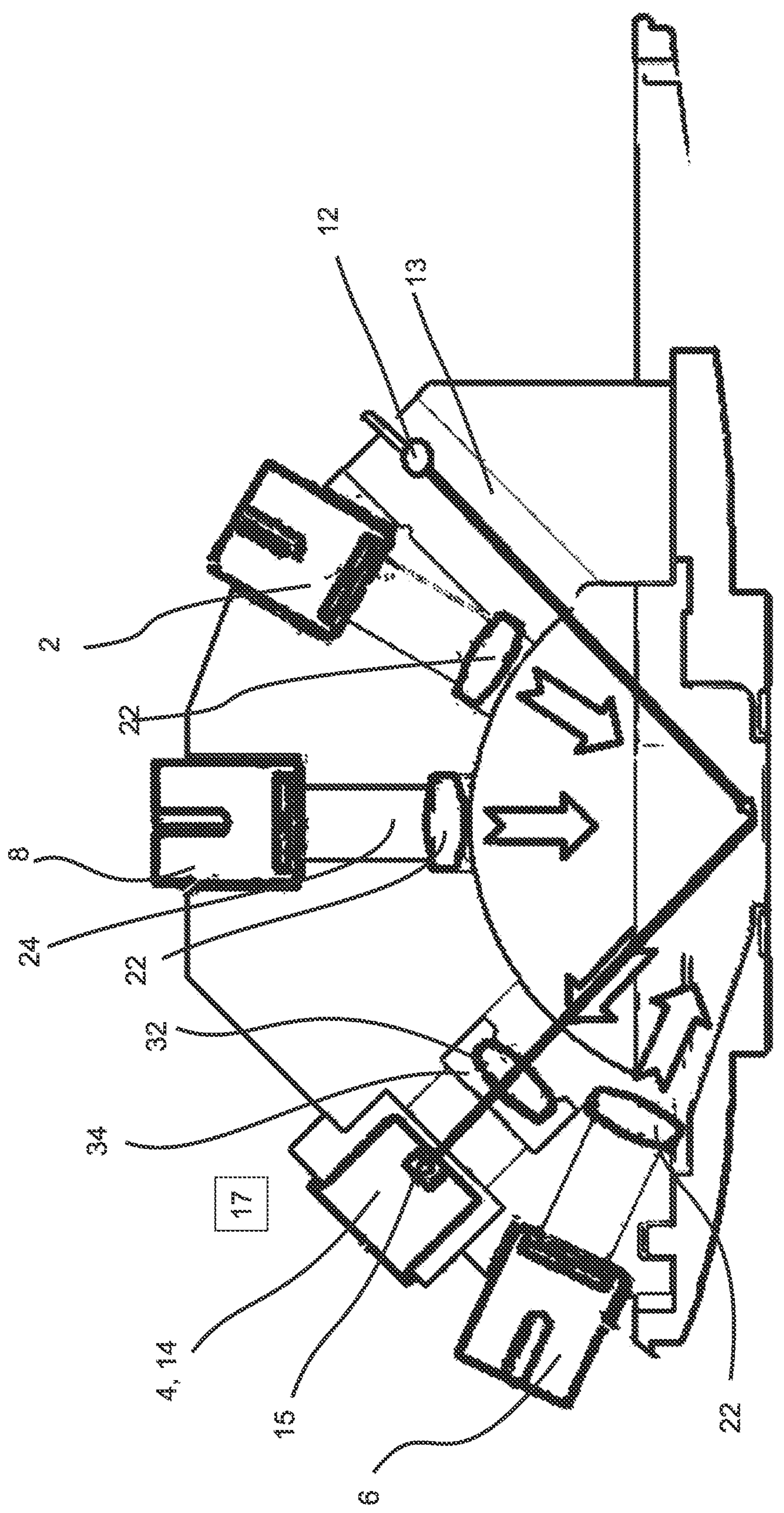
FIG. 4 shows a further illustration of the present invention.

FIG. 4 shows a schematic representation of an apparatus 1 according to the invention. An illumination device 12 is also provided here, which illuminates the surface, in this case at an angle of 45°. Preferably, this illumination device is a white light LED. Preferably, this illumination device is arranged in a light trap 13. A lens device (not shown) for collimation can be arranged in front of this illumination device. This illumination device 12 is preferably positioned at the angle of the specular reflection in the direction of the radiation analysis device 14 or the spectrometer.

The reference sign 14 thus refers to the radiation analysis device, which however also functions as a sensor device 4 at the same time. The device 14 has a spectrometer, wherein the reference sign 15 refers to a dispersive element.

This allows the incident radiation to be analyzed over many wavelengths.

In addition, the spectral analysis device also has an integrator device 17, which integrates the signal from the spectral analysis device output via all channels. This integration takes place in particular via the radiation emitted by the illumination device 12 and reflected onto the radiation analysis device 14.

In this way, its very simple and inexpensive gloss measurement can be realized, which can supplement the color measurement by using the spectral analysis device for gloss measurement purposes, in particular without disturbing the actual color measurement in any way. The available, spectrally resolved gloss values allow all the freedom of further computational processing, namely the calculation of a standard-compliant (v-lambda-weighted) gloss value or the output of other color-dependent (user-defined) gloss values. In particular for automotive lacquerings with a base coat (possibly with effect pigments) and a clear coat finish, both the influence of the gloss level of the clear coat on the color measurement of the base coat and the influence of the color of the base coat on the gloss measurement of the clear coat can be decoupled metrologically.

It can be seen here that, in particular, numerous lenses 22 are also integrated into the apparatus. These lenses are arranged at least partially in front of the radiation devices or illumination devices 2, 6 and 8.

Radiation channels 24 are arranged between these lenses 22 and the radiation devices (only one designated).

An aperture is preferably arranged between the second radiation and/or illumination device 12 and the surface 10 (i.e. in the beam path between the radiation and/or illumination device 12 and the surface 10) in order to collimate the beam path. Preferably, the second illumination device is arranged within a beam trap 13. The reference symbol 34 indicates a further aperture.

The applicant reserves the right to claim all features disclosed in the application documents as being essential to the invention, provided that they are new, either individually or in combination, compared with the prior art. It should also be noted that the individual figures also describe features which may be advantageous in themselves. The skilled person will immediately recognize that a certain feature described in a figure can also be advantageous without the adoption of further features from this figure. Furthermore, the skilled person recognizes that advantages can also result from a combination of several features shown in individual figures or in different figures.

What is claimed is:

1. An apparatus for examining surface properties of lacquered surfaces, comprising:

a first illumination device which illuminates a surface to be examined at a first illumination angle, a second illumination device which illuminates the surface at a second illumination angle, a first sensor device which detects radiation reflected and/or scattered by the surface illuminated by the second illumination device at a first recording angle, and a radiation analysis device which analyses radiation scattered and/or reflected by the surface with respect to its wavelength, and an integrator device which integrates a signal output by the radiation analysis device, wherein the first or the second illumination device irradiates radiation onto the surface and the radiation analysis device records the radiation irradiated by the first or the second illumination device and reflected by the surface.

2. The apparatus according to claim 1, wherein the radiation analysis device comprises a spectrometer.

3. The apparatus according to claim 1, wherein the radiation analysis device is arranged such that it records the radiation irradiated onto the surface by at least one of the first or second illumination device and scattered and/or reflected by the surface.

4. The apparatus according to claim 1, wherein the radiation analysis device is a component of the first sensor device.

5. The apparatus according to claim 1, wherein the apparatus comprises a third illumination device which is arranged with respect to the surface at a third illumination angle.

6. The apparatus according to claim 5, wherein the radiation analysis device is suitable and intended for analyzing radiation which has been irradiated onto the surface by the first and/or the third illumination device and has been scattered by the surface with respect to its wavelength.

7. The apparatus according to claim 1, wherein at least one illumination angle is between 30° and 60°, preferably between 35° and 55°, preferably between 40° and 50° and particularly preferably at 45°, and/or in that at least one illumination angle is greater than 60°, preferably greater than 65°, preferably greater than 70°, preferably greater than 75° and particularly preferably greater than 80°.

8. The apparatus according to claim 1, wherein the apparatus comprises a fourth illumination device, which is arranged with respect to the surface at a fourth illumination angle.

9. The apparatus according to claim 1, wherein at least one illumination device is suitable and intended for irradiating radiation of different wavelengths onto the surface.

10. The apparatus according to claim 1, wherein the first or the second illumination device is configured to be activated with a time delay and the first or the second illumination device irradiates radiation onto the surface and the radiation analysis device records the radiation irradiated by the first or the second illumination device and reflected by the surface.

11. The apparatus according to claim 1, wherein at least one of the first or the second illumination device is suitable and intended for irradiating radiation of different wavelengths onto the surface by use of different color filter elements, which are arranged between the illumination device and the surface.

12. The apparatus according to claim 1, wherein at least one of the first or the second illumination device is suitable and intended for irradiating radiation of different wavelengths onto the surface and for changing the color of at least one illumination or irradiated radiation at least temporarily.

13. The apparatus according to claim 1, wherein a position of the apparatus in relation to the surface to be examined is recordable and several measured values recorded at different positions on the surface are comparable with each other.

14. A method for examining surface properties of lacquered surfaces, wherein:

a first illumination device illuminates a surface to be examined at a first illumination angle, and a second illumination device illuminates the surface at a second illumination angle, a first sensor device records radiation reflected and/or scattered by the surface illuminated by the second illumination device at a first recording angle and outputs at least one value which is characteristic of the radiation reaching the first sensor device from the surface, and a radiation analysis device analyzes radiation scattered and/or reflected by the surface with regard to its wavelength, and an integrator device integrates a signal output by the radiation analysis device, wherein the first or the second illumination device irradiates radiation onto the surface and the radiation analysis device records the radiation irradiated by the first or the second illumination device and reflected by the surface.

15. The method according to claim 14, wherein both the value determined by the first sensor device and data recorded by the radiation analysis device are taken into account for an evaluation of the surface properties.

16. The method according to claim 14, wherein the radiation analysis device analyzes the radiation by a spectrometer.

17. The method according to claim 14, wherein a third illumination device illuminates the surface at a third angle.

18. The method according to claim 14, wherein the first or the second illumination device is activated with a time delay and the first or the second illumination device irradiates radiation onto the surface and the radiation analysis device records the radiation irradiated by the first or the second illumination device and reflected by the surface.

19. The method according to claim 14, wherein at least one of the first or the second illumination device irradiates radiation of different wavelengths onto the surface by use of different color filter elements, which are arranged between the first or the second illumination device and the surface.

20. The method according to claim 14, wherein a position of an apparatus comprising the first and second illumination devices, the first sensor device, the radiation analysis device, and the integrator device in relation to the surface to be examined is recorded and several measured values are recorded at different positions on the surface and compared with each other.

* * * * *